United States Patent
Takeuchi

[11] Patent Number: 5,312,172
[45] Date of Patent: May 17, 1994

[54] BRAKE CONTROL SYSTEM

[75] Inventor: Hiroaki Takeuchi, Aichi, Japan

[73] Assignee: Aisin Seiki Kabushiki Kaisha, Kariya, Japan

[21] Appl. No.: 23,631

[22] Filed: Feb. 26, 1993

[30] Foreign Application Priority Data

Feb. 28, 1992 [JP] Japan ............................. 4-043489

[51] Int. Cl.⁵ ................................................ B60T 8/32
[52] U.S. Cl. ............................... 303/113.1; 303/113.4; 303/115.2; 303/113.2; 303/DIG. 4
[58] Field of Search ................... 303/115.2, 113.1, 87, 303/50–56, DIG. 3, DIG. 4, 116.1, 119.1, 116.2, 92, 100, 113.4, 117.1, 113.2, 113.3, 115.1; 188/162, 355, 356, 358; 60/553, 547.1, 554

[56] References Cited

U.S. PATENT DOCUMENTS

| | | | |
|---|---|---|---|
| 3,514,162 | 5/1970 | Erlebach et al. | 303/116.2 |
| 3,731,979 | 5/1973 | Mikaila | 303/119.1 |
| 4,653,814 | 3/1987 | Burgdorf | 303/52 |
| 4,655,511 | 4/1987 | Leiber | 303/50 X |
| 4,730,877 | 3/1988 | Seibert et al. | 303/52 |
| 5,042,885 | 8/1991 | Villec | 303/115.2 X |
| 5,143,429 | 9/1992 | Higashima et al. | 303/115.2 |
| 5,147,116 | 9/1992 | Parker et al. | 303/115.2 |
| 5,152,588 | 10/1992 | Bright et al. | 303/115.2 |

FOREIGN PATENT DOCUMENTS

| | | | |
|---|---|---|---|
| 63-8058 | 1/1988 | Japan | 303/115.2 |
| 221982 | 5/1990 | Japan. | |
| 246426 | 10/1990 | Japan. | |

*Primary Examiner*—Douglas C. Butler
*Attorney, Agent, or Firm*—Sughrue, Mion, Zinn, Macpeak & Seas

[57] ABSTRACT

A brake control system comprises a simulator (4) for disconnecting a master cylinder (1) from a wheel cylinder (3) to vary the volume of the master cylinder in response to output pressure from the master cylinder when a brake is applied, and a wheel cylinder pressure control device (10) for controlling pressure supplied to the wheel cylinder. The wheel cylinder pressure control device includes a first pressure chamber (23) connected to the wheel cylinder, and a pressure control piston (18) for varying the volume of the first pressure chamber.

8 Claims, 6 Drawing Sheets

BRAKE CONTROL SYSTEM

BACKGROUND OF THE INVENTION

1. Field of the Invention

The present invention relates to a system for controlling braking effect to slow or stop motor vehicles.

2. Description of the Related Art

Attempts have heretofore been made to adjust a braking force in response to braking operation to improve the braking effect of a motor vehicle. Japanese patent publication Nos. 21982/90 and 46426/90, for example, disclose that a motor vehicle is decelerated in response to braking operation when the brake is applied. The prior art systems control a booster provided between a brake pedal and a master cylinder to assist in applying pressure to the brake pedal.

However, when the booster is controlled, reaction force is applied to the brake pedal. This deteriorates the brake feeling of a driver.

To this end, simulation means may be included to maintain the brake feeling when wheel cylinder pressure is adjusted. The simulation means is connected between the master cylinder and the wheel cylinder so as to vary the volume of the master cylinder in response to output pressure of the master cylinder and adjust pressure of the wheel cylinder in response to pedal pressure when the brake is applied. The simulation means controls wheel cylinder pressure in response to pedal pressure when the brake is applied. At that time, the master cylinder is disconnected from the wheel cylinder not only to control of the wheel cylinder simply in response to the pedal pressure, but also to effect anti-skid brake control in response to the speed of rotation of the wheels. In addition, when the pressure in the master cylinder is increased, the volume of a chamber communicated with the master cylinder is increased to ensure better brake feeling.

In order to control pressure of the wheel cylinder, the simulation control means typically includes a pump, an accumulator for accumulating output pressure from the pump, a reservoir, and a linear pressure control valve selectively connected to the accumulator and the reservoir so as to feed a predetermined pressure to the wheel cylinder. This type of means, however, requires frequent operation of the linear pressure control valve. Also, the pump needs be frequently operated in the event of a frequent leak in the linear pressure control valve.

Accordingly, it is an object of the present invention to provide a brake control system which includes simulation control means and allows for less frequent operation of a pressure control means.

SUMMARY OF THE INVENTION

As a first feature of the present invention, wheel cylinder pressure control means comprises a first pressure chamber connected to a wheel cylinder, and a pressure control piston devised to vary the volume of the first pressure chamber.

As a second feature of the present invention, the wheel cylinder pressure control means comprises a cylindrical housing within which the pressure control piston is slidably moved. The first pressure chamber is defined on one side of the pressure control piston. The wheel cylinder pressure control means further includes a lead screw received in the other side of the pressure control piston, a worm meshed with the lead screw, and motor means for rotating the worm.

As a third feature of the present invention, the wheel cylinder pressure control means comprises a cylindrical housing within which the pressure control piston is slidably moved. The first pressure chamber is defined on one side of the pressure control piston. The wheel cylinder pressure control means further includes a plunger received in the housing on the other side of the pressure control piston and including a lead screw therewithin, a worm meshed with the lead screw of the plunger, and motor means for rotating the worm.

As a fourth feature of the present invention, a simulation means comprises a cut off valve connected to the wheel cylinder, a hollow cylinder, a simulation control piston slidably moved within the cylinder and defining a first chamber and a second chamber in the cylinder, a first port formed in the cylinder to face the first chamber and connected to the master cylinder, a second port formed in the cylinder to face the second chamber and connected to the cut valve, a third port formed between the first port and the second port and connected to the master cylinder through an orifice, means for urging the simulation control piston toward the first chamber, a simulator chamber communicated with the first port and having a volume variable in response to pressure in the first chamber, and valve means operable in response to movement of the simulation control piston to provide a selective communication between the first chamber and the simulator chamber, the valve means being opened when the simulation control piston is urged toward the first chamber.

According to the first feature, when the simulation means is operable to disconnect the master cylinder from the wheel cylinder, the pressure control piston is moved to allow a fluid to flow from the first pressure chamber to the wheel cylinder so as to adjust braking effect.

According to the second feature, the motor means is energized to rotate the worm. This causes movement of the pressure control piston to allow a fluid flow from the first pressure chamber. Thus, the pressure of the wheel cylinder is adjusted to control braking effect when the simulation means is operable to disconnect between the master cylinder and the wheel cylinder.

According to the third feature, the motor means is energized to rotate the worm to cause vertical movement of the plunger. This results in a corresponding increase and decrease in the pressure on the other side of the pressure control piston to cause vertical movement of the pressure control piston. Thus, when the volume of the first pressure chamber is varied, and the simulation means is operated to disconnect the master cylinder from the wheel cylinder, a fluid flows from the first pressure chamber to the wheel cylinder so as to adjust braking effect.

The plunger includes a small diameter portion extending toward the pressure control piston. A seal means is provided between the side of the small diameter portion and the inner surface of the housing. This arrangement allows the pressure control piston to apply more force to the first pressure chamber when the plunger is moved.

According to the fourth feature, when the master cylinder has zero pressure, the cut off valve is opened to urge the simulation control piston toward the first chamber under the influence of the urging means. The first port is then communicated with the simulator chamber, and the third port is communicated with the second chamber to provide a communication between the master cylinder and the wheel cylinder through the orifice. When the cut off valve is closed, the simulation control piston is moved in response to pressure transferred from the master cylinder. When the pressure of the master cylinder is increased, and the simulation control piston is moved to disconnect the third port from the second chamber, the second chamber is closed to prevent further movement of the simulation control piston. On the other hand, the valve means is kept open, and the volume of the simulator chamber is varied. In this state, if the valve means is opened, the simulation control piston is moved further toward the second chamber. The valve means is then closed to terminate simulation effect. The simulation control piston is slid in response to master cylinder pressure to apply to the wheel cylinder pressure equal to the master cylinder. By closing the cut off valve during normal operation, the volume of the simulator chamber is varied in response to pedal pressure to provide better brake pedal feeling. Also, the wheel cylinder control means alters the pressure of the wheel cylinder as necessary.

In the event of malfunction, the cut off valve is closed, and the wheel cylinder pressure control means is rendered uncontrolled. This allows application of pressure equal to the pressure in the master cylinder to the wheel cylinder to obtain normal braking effect.

DESCRIPTION OF THE PREFERRED EMBODIMENTS

The present invention will now be described, by way of example, with reference to the drawings.

Figure 1:
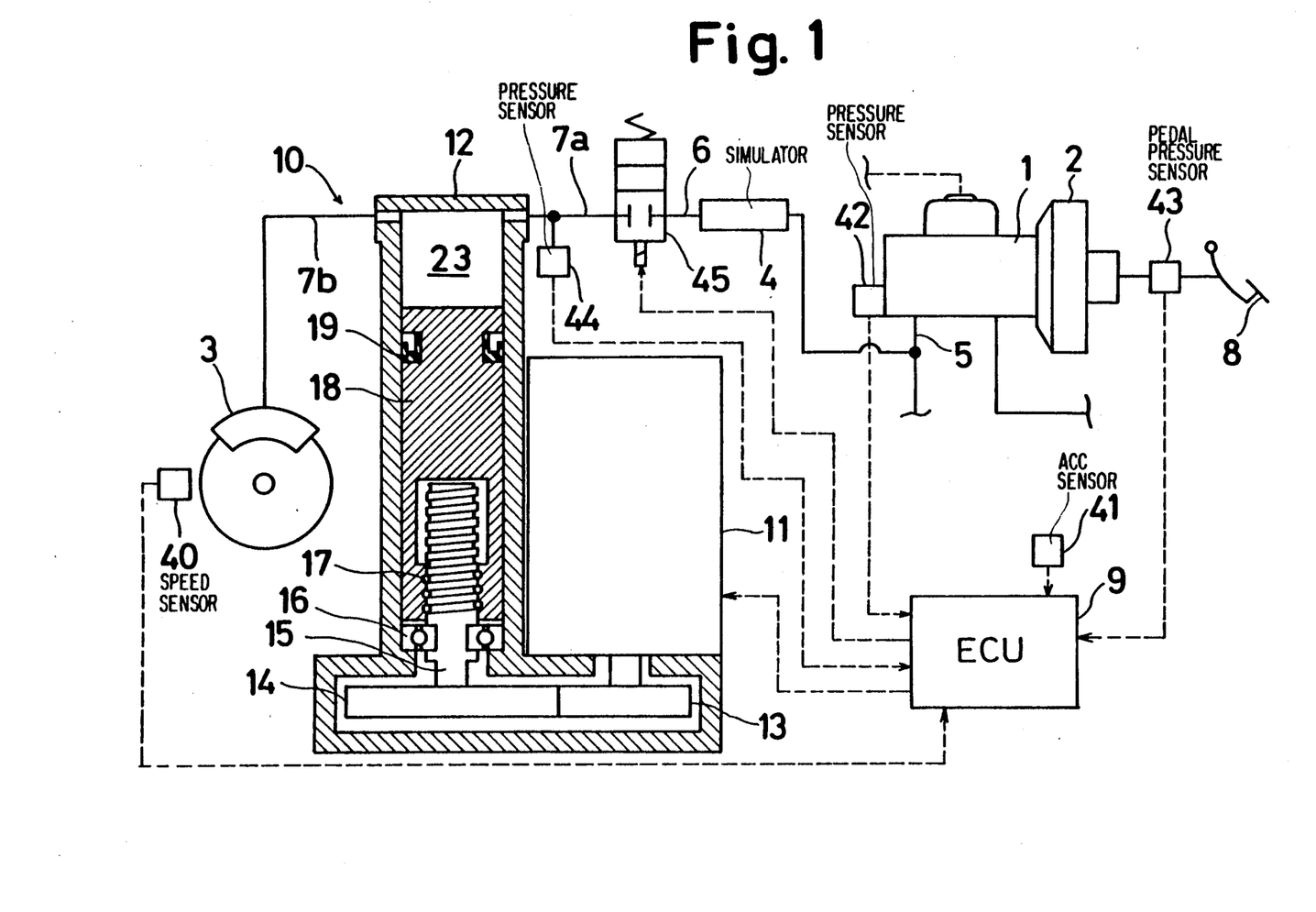
FIG. 1 illustrates a brake control system according to a first embodiment of the present invention.

FIG. 1 is a brake control system according to a first embodiment of the present invention. When a brake pedal 8 is depressed, a brake booster 2 is operated to increase pressure in a master cylinder 1. A braking force is then applied to a master cylinder line 5. A pedal pressure sensor 43 is provided adjacent to the brake pedal 8 and serves as a means for detecting how much pressure is applied to the brake pedal. A pressure sensor 42 detects pressure in the master cylinder 1.

A simulation means or unit 4 is disposed between the master cylinder line 5 and a line 6. The line 6 is connected to a wheel cylinder line 7a through a cut off valve 45. The cut off valve 45 is a normally open solenoid valve and closed when a signal is fed from an electronic control unit 9 as a control means. A wheel cylinder pressure control means or unit 10 defines a first pressure chamber 23 through which the wheel cylinder line 7a is connected to a wheel cylinder line 7b. The wheel cylinder line 7b is, in turn, connected to a wheel cylinder 3 of a disk brake. A pressure sensor 44 is included in the wheel cylinder line 7a to detect pressure in the wheel cylinder line 7a or in the wheel cylinder.

The wheel cylinder pressure control unit 10 comprises a motor 11, a housing 12, gears 13 and 14, a worm 15, and a pressure control piston 18. The motor 11 is a stepping motor, the speed of rotation of which is controlled by the electronic control unit 9. The gear 13 is fixedly mounted to the output shaft of the motor 11 and meshed with the gear 14.

The gears 13 and 14 jointly form a speed reducing gear mechanism. The gear 14 has a central shaft to which the worm 15 is secured. The worm 15 is rotatably mounted within the housing 12 through a bearing 16 and connected to the pressure control piston 18 through a lead screw 17. The pressure control piston 18 is slidably mounted in the housing 12. A seal 19 provides a tight seal between the pressure control piston 18 and the housing 12.

When the motor 11 is energized, the worm 15 is rotated through the gears 13 and 14 to cause the pressure control piston 18 to reciprocatingly slide within the pressure control piston 18. A first pressure chamber 23 is defined in the housing 12 on one side of the pressure control piston 18. Thus, the volume of the first pressure chamber 23 is varied in response to the rotation of the motor 11.

Figure 2:
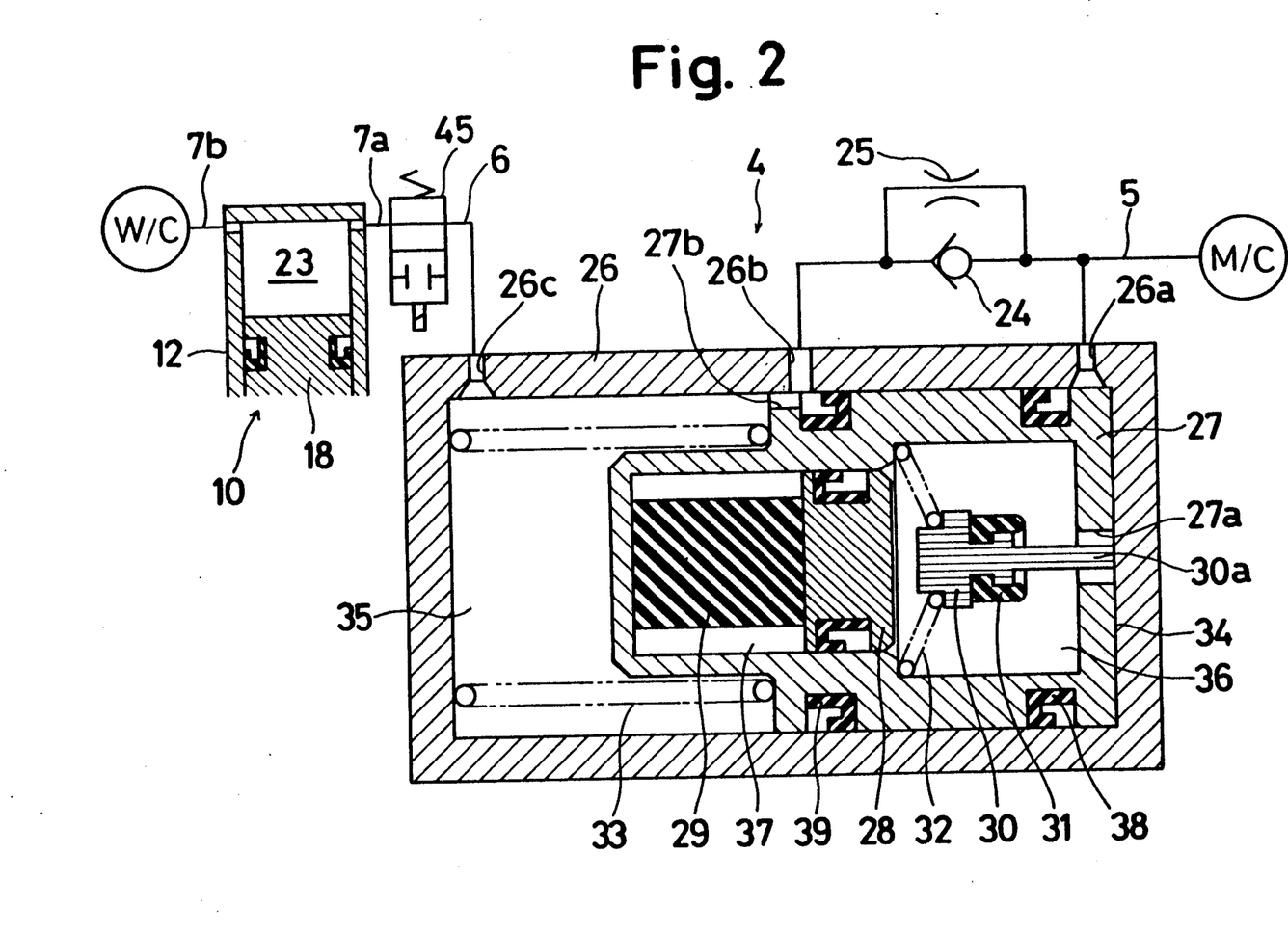
FIG. 2 is a sectional view of a simulation unit incorporated in the control system of FIG. 1.

FIG. 2 shows the structure of the simulation unit 4. The simulation unit 4 comprises a hollow cylinder 26, a hollow simulation control piston 27 slidably moved within the cylinder 26, and a simulator piston 28 slidably moved within the simulation control piston 27. The interior of the cylinder 26 is divided by the simulation control piston 27 into two chambers, a first chamber 34 at the right side of the simulation control piston 27 and a second chamber 35 at the left side of the simulation control piston 27 in FIGS. 3 and 4. A spring 33 as a bias means is disposed in the second chamber 35 to urge the simulation control piston 27 toward the first chamber 34. Two seals 38 and 39 are provided between the cylinder 26 and the simulation control piston 27 to prevent leakage of a fluid from the first chamber 34 to the second chamber 35 and vice versa. The interior of the simulation control piston 27 is divided into a third chamber 36 and a fourth chamber 37 at the right and left sides of the simulator piston 28, respectively. A simulator 29 is elastically deformed and disposed in the fourth chamber 37. The simulator 29 is made of rubber or similar material. The third chamber 36 is communicated with the first chamber 34 through a port 27a. A stem 30 is disposed within the third chamber 36. The stem 30 includes a projection 30a extending through the port 27a into the first chamber 34, a resilient valve body 31 adapted to prevent a fluid communication between the third chamber 36 and the port 27a, and a spring 32 disposed to urge the stem 30 to the right in FIG. 2. The cylinder 26 has three ports, a first port 26a facing the first chamber and coupled to the master cylinder line 5, a second port 26c facing the second chamber 35 and coupled to the line 5, and a third port 26b defined between the first port 26a and the second port 26c and coupled to the master cylinder line 5 through an orifice 25. A check valve 24 is disposed in the line 5 in parallel relationship to the orifice 25 so as to inhibit a fluid from flowing from the master cylinder line 5 to the third port 26b. As shown in FIG. 2, the simulation control piston 27 has a notch 27b to provide a fluid communication between the second chamber 35 and the third port 26b.

Figure 5:
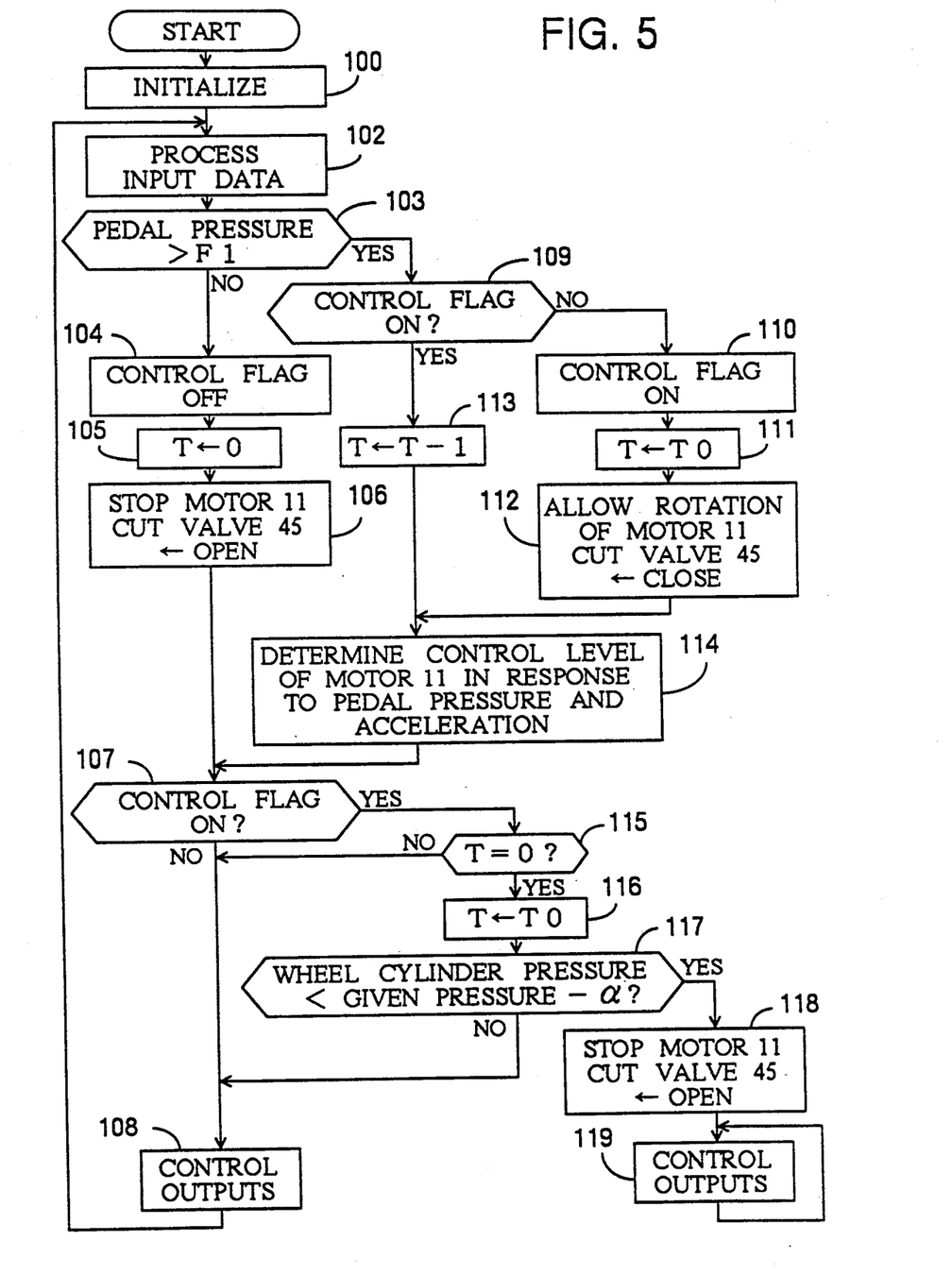
FIG. 5 is a flow chart showing program instructions stored in an electronic control unit.

Referring to FIG. 1, the electronic control unit 9 receives signals from the foot pressure sensor 43 and the pressure sensors 42 and 44. A speed sensor 40 detects the speed of rotation of wheels. An acceleration sensor 41 detects acceleration of a vehicle. The electronic control unit 9 includes a microcomputer and is operated according to a flow chart of FIG. 5. The electronic control unit 9 is on when the program starts out. Step 100 is first executed to connect inputs and outputs of the microcomputer and initialize memories. At step 102, the electronic control unit 9 analyzes various information sent from the pedal pressure sensor 43, the pressure sensors 42 and 44, the speed sensor 40, the acceleration sensor 41 and other sensors. At step 103, data derived from the pedal pressure sensor 43 is processed to determine pedal pressure applied to the brake pedal. This pedal pressure is then compared to a predetermined pressure level F1. The predetermined level F1 corresponds to the condition where no pedal pressure is applied to the brake pedal, but is slightly greater than zero pedal pressure to avoid accidental operation. When pedal pressure is less than the predetermined level F1, step 104 is executed to set a control flag "off". Step 105 is then executed to apply zero to a timer T. Step 106 is executed to stop the motor 11 and open the cut off valve 45. Thereafter, step 108 is executed to control the motor 11 and the cut valve 45. At step 103, when pedal pressure is greater than the predetermined level F1, step 109 is executed to determine the condition of the control flag. Step 110 is then executed to change the control flag from "on" to "off". The control flag is "on" when pedal pressure exceeds the predetermined level F1. At step 111, an integral number T0 is applied to the timer T. Step 112 is executed to rotate the motor 11 and close the cut off valve 45. Thereafter, step 114 is executed to control the motor 11 in response to pedal pressure and acceleration. At step 108, angular movement of the motor 11 is controlled. When the pedal pressure continues to exceed the predetermined level F1, the control flag becomes "on". Step 113 is then executed to subtract one from the value of the timer T. If the control flag continues to be "on" T0 times, then the value of the timer becomes zero. At this time, step 116 is executed in response to output routines at steps 107 and 115 so as to again set the value of the timer zero. At step 117, if wheel cylinder pressure is less than a given control level by at least a predetermined value α, it is likely that the malfunction of the motor 11 and its associated circuits occurs. In such a case, step 118 is executed to stop the motor 11 and open the cut off valve 45. Step 119 is next executed to continue control of the motor and the cut off valve.

With the system thus described, pressure in the master cylinder line 5 is low when the brake pedal 8 is not depressed. Under the circumstance, the spring 33 urges the simulation control piston 27 of the simulation unit 4 into a first position as shown in FIG. 2. The electronic control unit 9 opens the cut off valve 45 as no pressure is applied to the brake pedal. This causes a fluid to flow from the wheel cylinder 3 to the master cylinder 1 through the wheel cylinder lines 7b and 7a, the line 6, the second port 26c, the second chamber 35, the notch 27b, the third port 26b, the orifice 25, the check valve 24, the master cylinder line 5. As a result, the wheel cylinder provides no braking force.

Figure 3:
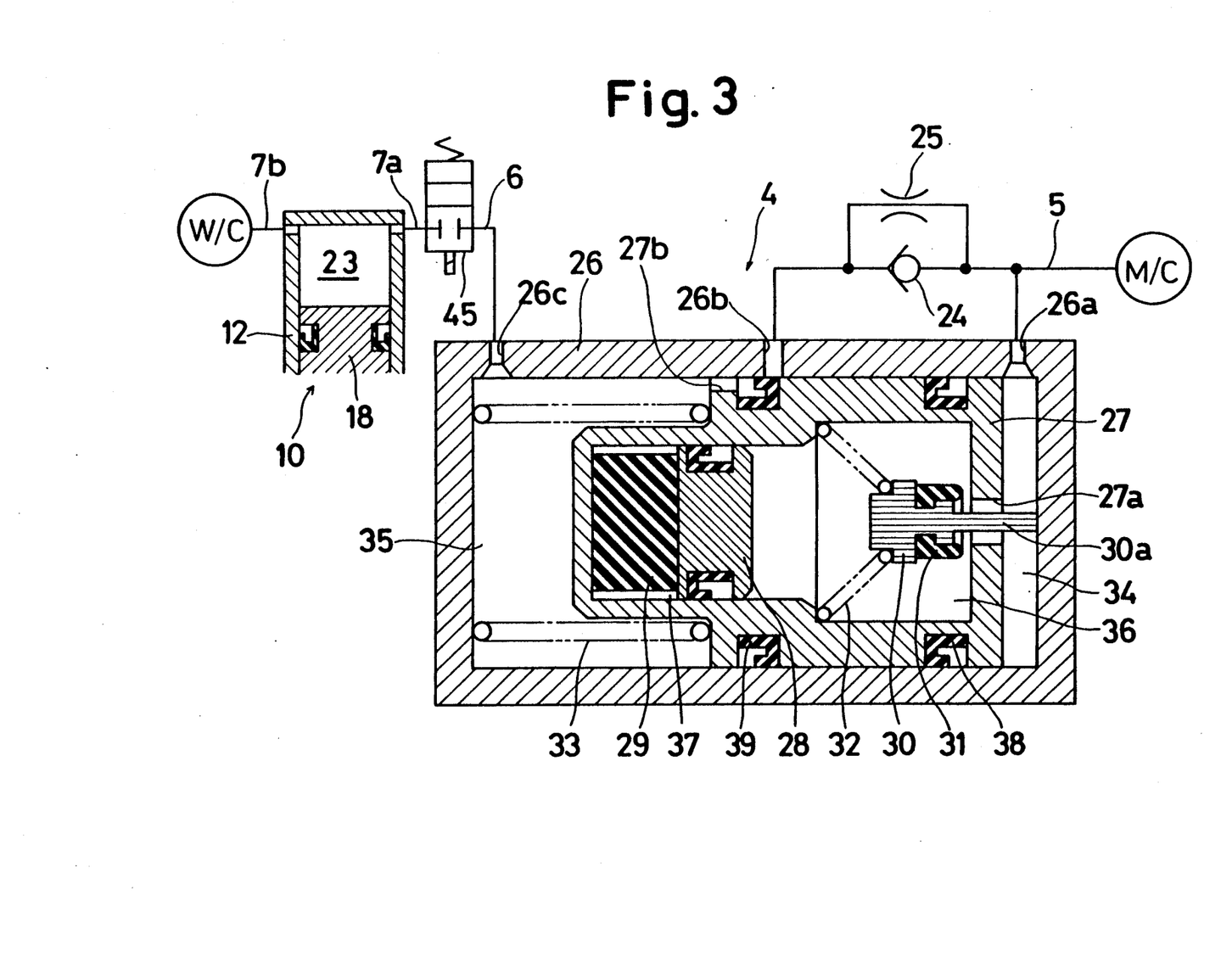
FIG. 3 is a sectional view showing the manner in which the simulation unit of FIG. 2 is operated.
Figure 4:
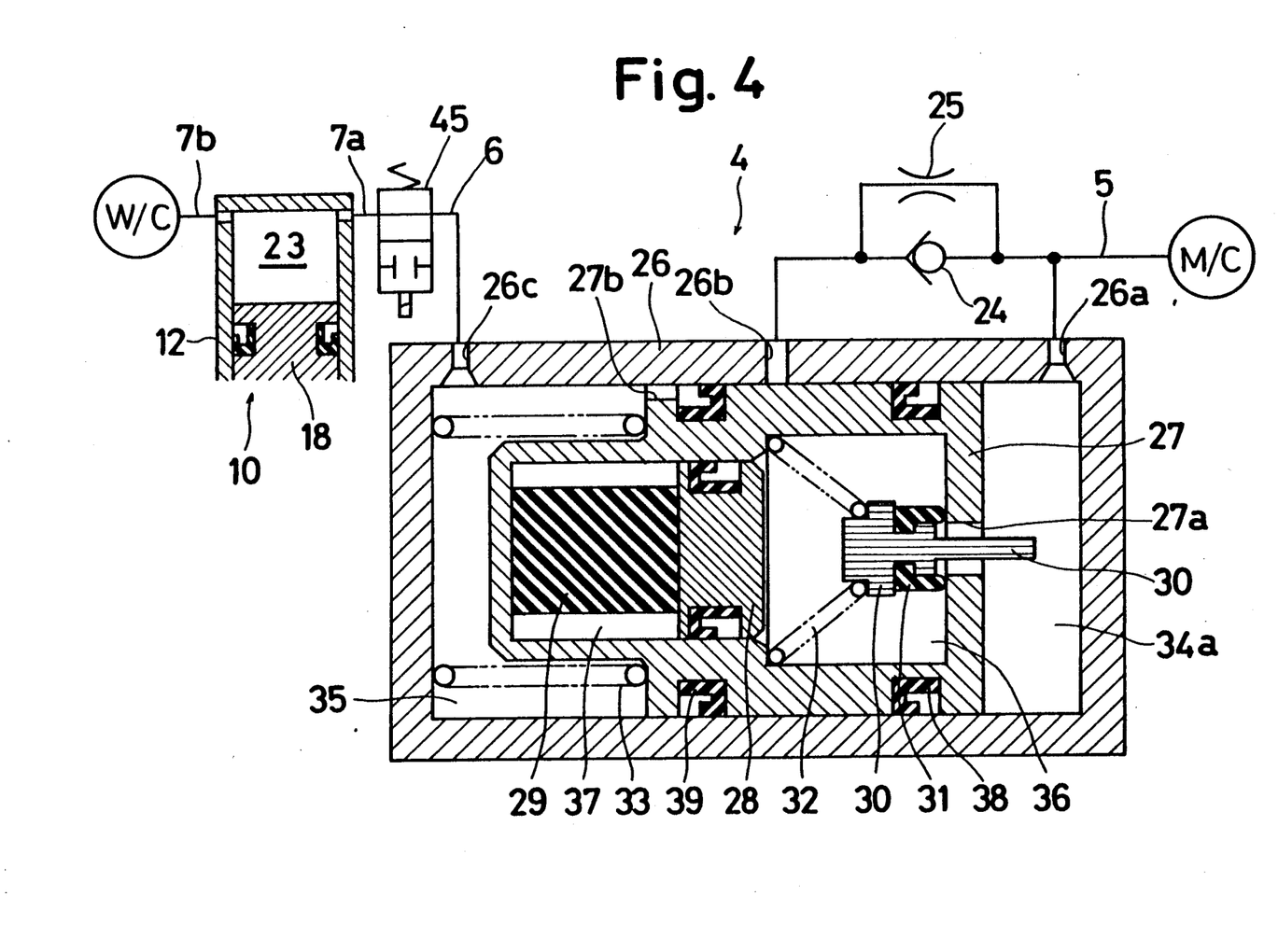
FIG. 4 is a sectional view showing the state in which the simulation unit malfunctions.

Pressure in the master cylinder line 5 is increased when the brake pedal 8 is depressed. This pressure is transferred to the first chamber 34 as well as the second chamber 35. However, pressure in the first chamber 34 is greater than that in the second chamber 35 as the transfer of pressure to the second chamber 35 is through the orifice 25. This causes the simulation control piston 27 to move against the bias of the spring 33. The electronic control unit 9, in turn, detects pedal pressure and closes the cut off valve 45. When the simulation control piston 27 is moved to a second position as shown in FIG. 3, then the third port 26b is closed. As the cut off valve is also closed, the second chamber 35 is closed to fix the simulation control piston 27 in the second position as shown in FIG. 3. At this time, the valve body 31 of the stem 30 is so positioned as to provide a communication between the third chamber 36 and the first chamber 34. This allows pressure in the master cylinder to be transferred to the third chamber 36 through the master cylinder line 5, the first port 26a, the first chamber 34, and the port 27a. As the pressure in the third chamber 36 is increased, the simulator piston 28 is moved to the left in FIG. 3 to press the simulator 29. As a result, the simulator 29 is elastically deformed to vary the pressure in the third chamber 36 in response to the pressure transferred from the master cylinder. This requires higher pedal pressure to press the brake pedal deeper and provides better brake pedal feeling. The electronic control unit 9, in turn, controls angular movement of the motor 11 so as to adjust the volume of the first pressure chamber 23. The internal pressure of the wheel cylinder is then adjusted, through the wheel cylinder line 7b, in response to the output from the electronic control unit 9.

In the event of disconnection between the electronic control unit 9 and the motor 11, failure of the motor 11, or malfunction of the gears 13 and 14, the pressure of the wheel cylinder 3 can not be increased regardless of control of the electronic control unit 9. This is dangerous since no braking effect is exerted on the wheels. To this end, the electronic control unit 9 is operable to deenergize the motor 11 and open the cut off valve 45 when the internal pressure of the wheel cylinder is not increased in response to the output from the electronic control unit 9.

The pressure in the second chamber 35 is decreased since the second chamber 35 is in communication with the wheel cylinder 3. The simulation control piston 27 is moved until the pressure of the master cylinder 1 is equal to that of the wheel cylinder 3 and held in a third position shown in FIG. 4. This causes the projection 30a of the stem 30 to move away from the wall of the first chamber. The valve body 31 is then brought into contact with the wall of the third chamber 36 to prevent communication between the third chamber 36 and the port 27a. As the third port 26b is kept closed, the third chamber is closed so as not to give simulator effect to the master cylinder. The simulator control piston 27 is slid in response to the difference in pressure between the first chamber and the second chamber. Thus, depression of the brake pedal causes the simulation control piston 27 to move to the left to increase the pressure in the wheel cylinder.

By this arrangement, the pressure in the master cylinder is varied in response to the pressure in the wheel cylinder even in the event of failure of the motor 11 and its associated circuits. This provides normal braking force although high braking effect is not obtained.

Figure 6:
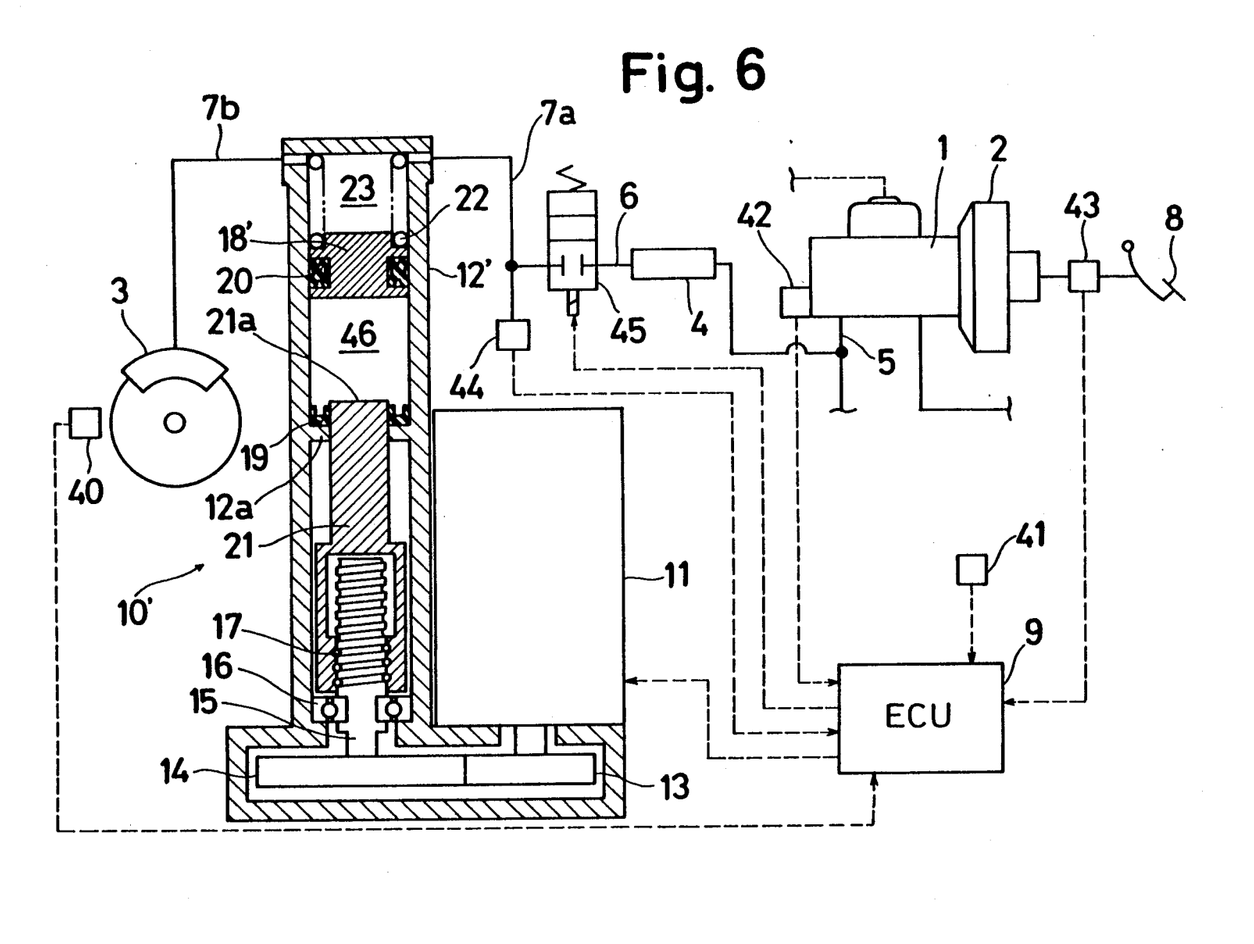
FIG. 6 illustrates a brake control system according to a second embodiment of the present invention.

Referring to FIG. 6, there is shown a brake control system according to a second embodiment of the present invention. This embodiment is different from the first embodiment in that modification is made to the wheel cylinder pressure control unit 10. In the second embodiment, a wheel cylinder control unit 10' includes a housing 12', a plunger 21, and a pressure control piston 18'. The plunger 21 is coupled to the worm 15 through the lead screw 17. The plunger 21 has a small diameter portion 21a at its upper end. The housing 12' has an inner collar 12a through which the small diameter portion 21a of the plunger 21 is slidably moved. A seal 19 is disposed between the small diameter portion 21a of the collar 12a. The pressure control piston 18' is slidably moved within the housing 12' and located above the plunger 21. A seal 20 is disposed between the pressure control piston 18' and the housing 12'. The pressure control piston 18' is urged downwards (in FIG. 6) under the influence of a spring 22. The pressure control piston 18' includes a first upper pressure chamber 23 and a second lower pressure chamber 46. A noncompressible fluid (for example, oil) is filled in the second pressure chamber 46. The remaining components of the second embodiment are identical in structure to those of the first embodiment.

In use, the motor 11 is energized to rotate the worm 15. This causes reciprocating sliding movement of the plunger 21. When the plunger 21 is moved up, the small diameter portion 21a raises pressure in the second chamber 46. This increase in the pressure of the second chamber causes the pressure control piston 18' to move toward the first pressure chamber 23 to raise pressure in the wheel cylinder 3. On the other hand, when the plunger 21 is moved down, the pressure in the second pressure chamber 46 is decreased to cause the pressure control piston 18' to move toward the second pressure chamber 46. This results in a decrease in the pressure of the wheel cylinder.

In the second embodiment, the small diameter portion 21a of the plunger 21 is less in diameter than the pressure control piston 18'. This arrangement allows application of greater force to the pressure control piston 18'.

As explained above, the brake control system of the invention is of the type wherein the first pressure chamber has a variable volume. This requires less frequent operation of the solenoid.

Further, the use of the motor means provides high pressure gradient.

The speed reducing gear mechanism and the stepped plunger provide high power pressure control piston and enable the use of a light and compact actuator.

What is claimed is:

1. A brake control system for automatically controlling a wheel cylinder pressure comprising:
 a master cylinder for generating an operating fluid pressure in accordance with a brake pedal pressure applied by a brake pedal operatively connected to said master cylinder;
 a wheel cylinder adapted to be mounted on a wheel;
 wheel cylinder pressure control means operatively connected between said master cylinder and said wheel cylinder;
 simulation means operatively connected between said wheel pressure control means and said master cylinder for applying a reaction force to said brake pedal and including a cut-off valve for disconnecting said master cylinder from said wheel cylinder pressure control means;
 pressure sensor means for sensing brake pedal pressure;
 speed sensor means for sensing speed of rotation of said wheel; and
 control means for controlling said wheel pressure control means in accordance with one of said brake pedal pressure and said speed of rotation of said wheel.

2. A brake control system according to claim 1, wherein said wheel cylinder pressure control means comprises a cylindrical housing within which a pressure control piston is slidably moved, a first pressure chamber being defined in said housing on one side of said pressure control piston,
 said wheel cylinder pressure control means further including a lead screw disposed in an opposite side of said pressure control piston, a worm meshed with said lead screw, and motor means for rotating said worm.

3. A brake control system according to claim 2, wherein said motor means comprises a stepping motor having an output shaft, and a speed reducing gear mechanism arranged between said output shaft of said stepping motor and said worm.

4. A brake control system according to claim 1, wherein said wheel cylinder pressure control means comprises a cylindrical housing within which a pressure control piston is slidably moved, a first pressure chamber being defined in said housing on one side of said pressure control piston,
 said wheel cylinder pressure control means further including a plunger received in said housing on an opposite side of said pressure control piston and including a lead screw therewithin, a worm meshed with the lead screw of the plunger, and motor means for rotating said worm.

5. A brake control system according to claim 4, wherein said plunger has a small diameter portion extending toward said pressure control piston, further including seal means for providing a seal between the side of said small diameter portion and the inner surface of the housing.

6. A brake control system according to claim 4, wherein said motor means comprises a stepping motor having an output shaft and a speed reducing gear mechanism arranged between said output shaft of said stepping motor and said worm.

7. A brake control system according to claim 1, wherein said simulation means comprises:
 said cut-off valve connected to said wheel cylinder;
 a hollow cylinder;
 a simulation control piston slidably moved within said cylinder and defining a first chamber and a second chamber in said cylinder;
 a first port formed in said cylinder to face said first chamber and connected to said master cylinder;
 a second port formed in said cylinder to face said second chamber and connected to said cut-off valve;
 a third port formed between said first port and said second port and connected to said master cylinder through an orifice;
 means for urging said simulation control piston toward said first chamber;
 a simulator chamber communicated with said first port and having a volume variable in response to pressure in said first chamber; and
 valve means operable in response to movement of said simulation control piston to provide a selective communication between said first chamber and said simulator chamber, said valve means being opened when said simulation control piston is urged toward said first chamber.

8. A brake control system according to claim 7, wherein said cut-off valve is closed when braking effect is controlled in response to said brake pedal pressure.

* * * * *